United States Patent
Jiang et al.

(10) Patent No.: US 10,721,953 B2
(45) Date of Patent: Jul. 28, 2020

(54) THERMAL-REVERSIBLE GELLING STARCH

(71) Applicant: Corn Products Development, Inc., Westchester, IL (US)

(72) Inventors: Hongxin Jiang, Bridgewater, NJ (US); Christopher Lane, Bridgewater, NJ (US); Brad Ostrander, Bridgewater, NJ (US); Xin Yang, Bridgewater, NJ (US)

(73) Assignee: Corn Products Development, Inc., Westchester, IL (US)

(*) Notice: Subject to any disclaimer, the term of this patent is extended or adjusted under 35 U.S.C. 154(b) by 0 days.

(21) Appl. No.: 16/702,170

(22) Filed: Dec. 3, 2019

(65) Prior Publication Data

US 2020/0100533 A1 Apr. 2, 2020

Related U.S. Application Data

(62) Division of application No. 15/400,445, filed on Jan. 6, 2017, now Pat. No. 10,524,492.

(51) Int. Cl.
| | |
|---|---|
| *A23L 29/219* | (2016.01) |
| *C08B 30/12* | (2006.01) |
| *C08L 3/02* | (2006.01) |
| *A23L 29/212* | (2016.01) |
| *A23L 33/10* | (2016.01) |
| *C08B 31/00* | (2006.01) |

(52) U.S. Cl.
CPC ............ *A23L 29/219* (2016.08); *A23L 29/212* (2016.08); *A23L 33/10* (2016.08); *C08B 30/12* (2013.01); *C08B 31/00* (2013.01); *C08L 3/02* (2013.01); *A23V 2002/00* (2013.01)

(58) Field of Classification Search
None
See application file for complete search history.

(56) References Cited

PUBLICATIONS

Boyer et al, effect of gene dosage at high amylose loci on the properties of the amylopectin fractions of the starches, Starch/Starke, 32, 7, S, 217-222 (Year: 1980).*

* cited by examiner

*Primary Examiner* — Stefanie J Cohen
(74) *Attorney, Agent, or Firm* — Jacqueline Cohen; Jason Grauch; Rachael Casey

(57) ABSTRACT

A thermal-reversible gelling agent derived from the modified starch of a waxy corn variant having an endosperm genotype with one or two doses of the recessive amylose-extender gene (ae). The starch may be modified enzymatically, physically, or by acid hydrolysis. Such gelling agents exhibit properties that may be useful in thickening or providing otherwise unique textures to foods.

12 Claims, No Drawings

THERMAL-REVERSIBLE GELLING STARCH

CROSS-REFERENCE TO RELATED APPLICATION

The present application is a Divisional of Non-Provisional Application Ser. No. 15/1400445 filed Jan. 6, 2017 now U.S. Pat. 10,524492; which is incorporated herein by reference in its entirety for ail purposes.

FIELD OF THE INVENTION

The present invention relates to gelling agents for use in food production and more particularly to the use of modified starch from specific ae waxy corn endosperm genotypes to form a thermal-reversible gelling agent having good gel strength and rheological properties.

Corn has many genes affecting amylopectin structure and amylopectin/amylose ratio in starch. One is Wx or waxy. The recessive waxy allele (wx) reduces the amount of amylose present in starch. Another is Ae or amylose-extender. The recessive amylose-extender allele (ae) increases the straight chain length of amylopectin. The genes complexly interact as dominant and additive gene effects affect both the amount of starch and its structure. Starches from various corn genotypes and corn endosperm genotypes are used in the food industry for many purposes, but have proved to be of limited use in making thermal reversible gels. For example, enzymatically debranched waxy maize has been shown to form reversible gels but acid hydrolyzed waxy maize cannot.

Thermal-reversible gels are substances that transition into and out of the gel phase depending on conditions, like heat. They are important in the food industry for, among other things, controlling sensory properties. A need exists for a corn starch that is able to make stronger thermal-reversible gels after using a broader set of modifications.

SUMMARY

Disclosed herein are gelling agents made from a corn starch having both recessive wx and ae alleles. More specifically the corn endosperm has one or two doses (or copies) of ae, and has three doses of wx. The modified corn starch forms significantly stronger thermal-reversible gels than can be obtained from similarly modified waxy corn gelling agents. The starch may be digested enzymatically or by acid hydrolysis. In another embodiment the starch may be debranched enzymatically. In another embodiment the starch may be sheared. Notably, in many instances the gelling agent can be made without first gelatinizing the starch granule.

Also disclosed are gels made from the disclosed modified starch, methods for making those gels, as well as food products using such gels and methods of making those foods.

DETAILED DESCRIPTION

For purposes of this application ae means the recessive amylose-extender allele.

For purposes of this application Ae means the dominant wild-type amylose-extender allele.

For purposes of this application wx means the recessive waxy allele.

For purposes of this application Wx means the dominant wild-type waxy allele.

For purposes of this application a homozygous aewx corn starch or homozygous ae waxy corn starch means starch from a corn endosperm that is homozygous for wx and ae alleles.

For purposes of this application an aewx corn starch or ae waxy corn starch is starch extracted from a corn endosperm that has three doses of wx and one or two doses of ae.

As used in this application, thermal-reversible gels are gels that become a solution upon reheating and form a gel again upon cooling. The gels are stable enough to go through at least 5 melt/gel cycles and preferably at least 10 cycles before significant retrogradation occurs.

While a person of ordinary skill in the art would understand that gels can be made according to various methods, using various concentrations to obtain various properties, a non-exclusive embodiment of a thermal reversible gel using the disclosed gelling agent can be made according to the following process and has the following properties:

Gel preparation: modified aewx starch 15% (w/w in distilled water) is fully gelatinized by heating the slurry in boiling water bath for 20 minutes removed from heat and cooled until it gels.

Gel quality: gels exhibit firmness, as measured by the punch force test set forth in Example 1, of at least 100 g after one week's rest at 4° C.

As used herein modified starch means a starch that is subjected to acid hydrolysis, shear, enzymatic reaction, or other reaction that thins, debranches, or degrades the native starch. Such modifications do not include reactions to stabilize the starch such as chemical derivatization (e.g. acetylation, propylation, esterification, etherification, etc.), cross-linking, or heat treatment reactions such thermal inhibition, annealing, heat-moisture treatment, and the like. This, however, does not preclude the modified starch from being stabilized or otherwise altered to further change the properties of the thermal reversible gelling agent.

Disclosed herein is a corn starch that can be modified to form a thermal-reversible gelling agent capable of forming stronger thermal-reversible gels than gelling agents made from the starch of other corn variants made through similar processes. The corn starch is from an aewx corn genotype having one or two doses of ae. The wx allele reduces the amount of amylose within a starch granule so that the starch granule of the homozygous wx has little amylose content (less than 3%). In a homozygous wx corn the number of ae doses generally determines the amylopectin chain length, with 3 doses having generally longer chains than 2, and 2 doses having generally longer chains than 1 dose.

In embodiments of the invention, the starch comes from corn endosperm that has an aewx genotype that is homozygous for the recessive wx allele, but has one or two doses of ae. More specifically in one embodiment the starch comes from corn endosperm having an aewx genotype with one dose of ae. In another embodiment the starch comes from corn endosperm with an aewx genotype with two doses of ae.

Corn starches tend to form irreversible gels or do not gel. Without being bound by theory this results from the interaction of amylopectin and amylose (or lack thereof) in the starch granule. Amylose, a long, straight chain molecule, can more easily align itself into organized molecule complexes like gels, which if too strongly bound (through intermolecular forces like hydrogen bonding) are irreversible. So amylose containing corn starch tends to form irreversible gels. Amylopectin, a heavily branched molecule, cannot organize itself easily. So it tends not to gel. So waxy corn, which contains little to no amylose, tends not to gel, or to form weak gels under special conditions.

Also disclosed herein are processes to modify the above disclosed starches to form gelling agents capable of forming thermal-reversible gels. Generally, the disclosed processes involve thinning, hydrolysis, or debranching of the amylopectin. These effects can be chemically achieved, enzymatically achieved, or achieved through shear.

In one embodiment the disclosed starches are modified using enzymes. In one embodiment the enzymatic reaction may debranch the amylopectin, i.e. a reaction that cleaves 1-6 glycosidic bonds. In another embodiment, the enzymatic reaction may be a thinning reaction, i.e. a reaction that cleaves 1-4 glycosidic bonds. The reaction may also cleave both the 1-4 and 1-6 glycosidic bonds. Suitable enzymes include α-amylase, pullulanase type I and type II, isoamylase, endoamylases generally, and other enzymes capable of cleaving 1-4 glyocosidic bonds and/or 1-6 glycosidic bonds.

A person of ordinary skill in the art would understand that the reactions are dictated by the enzyme used, and such artisan can adjust the general methods described herein to suit the enzymes used and particular needs. Suitable pH can be between 4 and 10, although typically reactions will take place in acidic solutions (i.e. pH below 7), and more typically will occur at reactions between pH of 4 and 6. Suitable temperatures will typically be between about 45° and 95° C.

The reaction may be run for various lengths of time depending on the type of enzyme used, and the desired final properties of the gel. Typically reaction times run between 0.5 to 5 hours. At the extremes a reaction that does not run long enough does not sufficiently digest the starch to make a thermal-reversible gelling agent, and a reaction that runs too long will over digest the starch and also will not make a thermal-reversible gelling agent.

In one embodiment the starch is modified by an enzyme that cleaves the 1-4 glycosylic bonds, like α-amylase. Starch slurry is prepared with between 10% to 50% starch in solution (w/w) in an acidic solution (i.e. less that pH 7). Preferably the concentration of starch is 20% to 40% (w/w) and most preferably about 30% (w/w). Also, preferably the solution has a pH of between 4 and 6, and most preferable about 6. Enzyme is added to the starch slurry at a concentration of between 1.0% and 0.01% (w/w, dsb) and more preferably around 0.1% (w/w, dsb). The acidic starch/enzyme slurry is incubated at a controlled temperature that ranges from 50° to 95° C., more preferably between about 90° to 95° C. The reaction is allowed to run more than 0.5 hours, more preferably more than 1 hour. The reaction is stopped by conventional means such as boiling or freezing the slurry. The digested starch is then recovered by freeze drying, or other evaporative means. Although, preferably the starch is not gelatinized before reaction with α-amylase, the starch may be gelatinized before adding the enzyme. Additionally the starch may be pre-gelatinized so that it is soluble before being added to solution.

In another embodiment the starch is debranched by an enzyme that cleaves the 1-6 glycosylic bonds, like pullulanase or isoamylase. Starch slurry is made with between 10% and 50% (w/w) starch in distilled water, preferably between 20% and 40% (w/w) starch, and most preferably about 20% (w/w) starch. The slurry is adjusted to be acidic, having a pH below 7, and preferably the pH is below 5, and most preferably is about 4.5. In this embodiment the debranching reaction typically runs at lower temperatures than the enzymatic digestion reaction described above so the starch is preferably gelatinized in solution prior to adding the enzyme. Alternatively, the starch may be solubilized prior to being added to the slurry (for example by jet cooking). The slurry temperature, when adding enzyme, is between 45° and 65° C., preferably between 50° and 60° C., and more preferably about 55° C. The slurry is held at temperature and the enzyme is added to the slurry in concentrations between 1% and 5% (w/w, dbs), and preferably about 2% (w/w, dsb). The reaction is run for between 1 and 6 hours, more preferably between 2 and 5 hours, and most preferably between 3 and 4 hours. The reaction is stopped by conventional means such as freezing or boiling the solution. The starch is recovered by standard evaporative means.

In another embodiment the disclosed starches may be modified by acid hydrolysis, which both disrupts the starch granule and thins starch itself by cleaving glycosidic linkages. As with enzymatic reactions the starch may be pre-cooked before being added to the solution or may by gelatinized in solution. Because the acid disrupts the granule structure, as well as digests the starch it is preferred that the starch not be solubilized prior to being added to solution, and that the reaction be run on granular starch.

Acid hydrolysis is run in strongly acidic solutions, i.e. pH less than 4, and preferably pH much less than 4. In one embodiment, solutions will have a pH less than 1. Starch slurry is made with between 10% and 50% (w/w) of starch, preferably between 20% and 40% (w/w) starch, and most preferably about 35% (w/w) starch. The slurry is mixed with strong acid such as hydrochloric or sulfuric acid. The acid is added in the range of between 0.5% and 2.5% (w/w), preferably between 1% and 2% (w/w) and most preferable about 1.5% (w/w). The slurry is held at temperature between 45° and 65° C., preferably between 50° and 60° C., and most preferably about 55° C. The reaction is allowed to run for between 2 and 36 hours, preferably between 4 and 24 hours. In one embodiment the reaction may be run for about 8 hours, in another embodiment the reaction may be run for about 16 hours. The reaction is stopped by neutralizing the solution by adding a sufficient amount of a basic solution, for example using between 1% and 10% (w/v) sodium hydroxide solution. The starch is recovered by filtration and washed with distilled water. The modified starch is dried at temperatures that avoid gelatinization of the starch, i.e. below about 60° C.

In another embodiment the starch may be modified by shear to debranch the starch. Most physical processing methods can do this, for examine subjecting the starch to high speed mixers, pumps, extruders, or homogenizers. Such processes act to debranch the starch. The physical shearing processes are less dependent on the pH of the solution than enzymatic or acidic modifications. So solutions may be basic, acidic or neutral. In one embodiment the starch is subjected to physical shear before subsequent incorporation into a food product for further process. The starch may also be incorporated prior to shearing and be subjected to physical shear as part of food processing. The starch concentration in the food product is typically between 0.1% and 50% (w/w) of starch. The starch is gelatinized, or may be pre-gelatinized by known methods such as jet cooking. Prior to physical processing, the starch is heated to fully cook (gelatinize) or activate (a pre-gelatinized starch), so that it will form a paste. The resultant paste is sheared to debranch the starch. In one embodiment the resultant paste is processed in a high speed mixer for about 1 minute or more, preferably more than 5 minutes.

The starches modified as disclosed herein are useful for making thermal-reversible gels. The properties of the thermal-reversible gels depend on the modifications. But compared to prior art corn-based gelling agents, the disclosed starches form stronger thermal-reversible gels regardless of the modification. As used in this application thermal-reversible gels are gels that become a solution upon reheating and form a gel again upon cooling. The gels are stable enough to go through at least 5 melt/gel cycles and preferably at least 10 cycles before significant retrogradation occurs.

Gels were made by mixing starch with solution with the starch concentration being between 10% and 50% (w/w) of starch, preferably between 20% and 40% (w/w) starch. In one embodiment gels were made from slurry having a starch concentration of 15% (w/w). In another embodiment gels were made from slurry having a starch concentration of 30% (w/w). The starch is gelatinized by heating the slurry to between 90° and 99° C. for between 10 to 30 minutes. Alternately the starches may be pre-gelatinized before mixing with solution. The pre-gelatinized starch slurry is then heated similarly to the process described above to activate the starch. The starch solution is then cooled until it gels, which, depending on the process used to modify the starch, is between 60° and 85° C.

The strength of gels made from the modified starches is different depending on the concentration of the starch in solution as well as according to the method for modifying starch. Certain generalities, however, have been observed. Gels tend to increase in strength over time, and although some solutions do not gel immediately, the solutions gel after being allowed to rest between one day and one week. Additionally, enzymatically debranched starches developed the strongest gels of the methods explored. Of the three reaction times tested, starches debranched in enzyme for 3.5 hours were stronger than reactions run for 2 or 5 hours. This shows that the reaction must run for sufficient time to debranch the starches, but if left to run too long tend to over debranch the starch. For acid hydrolysis, gels tended to be strongest when hydrolyzed for 8 hours or less. Enzymatic digestion, such as by α-amylase, formed stronger gels if allowed to run for more than 1 hour. And sheared starches were capable of forming gels after shearing for 1 minute, but were significantly stronger after 5 minutes of shearing. Although the gels were still stronger after 15 minutes of shearing, the increase in gel strength compared to 5 minutes of shearing was less than the increased gel strength between solutions sheared for 1 minute and 5 minutes.

While a person of ordinary skill in the art would understand that gels can be made according to various methods, using various concentrations to obtain various properties, a non-exclusive embodiment of a thermal reversible gel using the disclosed gelling agent can be made according to the following process and has the following properties:
  Gel preparation: modified aewx starch 15% (w/w in distilled water) is fully gelatinized by heating the slurry in boiling water bath for 20 minutes removed from heat and cooled until it gels.
  Gel quality: gels exhibit firmness, as measured by the punch force test set forth in Example 1, of at least 100 g after one week's rest at 4° C., and more preferably at least 100 g.

Modified starches made by the disclosed method can be used to form gels useful in various food applications. Examples include, but are not limited to, imitation cheeses, soups, desserts, sauces, gravies, pie fillings, yogurts, puddings, and dressings. The disclosed starches may be used alone as the gelling agent or in combination with other gelling agents. The gelling agents of the present invention may be used alone or with viscosifiers, or other constituents to provide unique textures to foods. The starch can be added as a modified starch or added as an unmodified starch that will be modified during food processing. The starch or modified starch will be added as per the needs of the application but generally in amounts of between 0.1% and 50% starch (w/w).

Certain aspects of the present invention are further described by way of the following examples, which are provided as illustrations and should not be construed to limit the scope of the invention in any way. Persons of ordinary skill in the art will recognize that routine modifications may be made to the methods and materials used in the examples, which would still fall within the spirit and scope of the present invention.

Methods and Results

EXAMPLE 1

Gel Strength

Gel strength was measured using a texture analyzer (TA.XT). The starch solution is poured into 10 mL beakers and stored at 4° C. for 1 or 7 days. A 5 mm sphere probe (TA-8B) was used to punch depth of 15 mm in the gel and the required force was recorded. Samples were taken from the refrigerator just before the test so that the gels were still at refrigerated temperature during measurement.
Testing parameters:
  Trigger force: 2 g;
  Test speed: 1 mm/sec (6 cm/min);
  Test distance: 15 mm.

EXAMPLE 2

Enzymatic Debranching

Starch was mixed (20% w/w) with distilled water. The pH of the slurry was adjusted to 4.6 using 0.5M HCl solution. The slurry was cooked in a boiling water bath with continuous stirring for 15 min to achieve complete gelatinization of the starch. The resulting paste was then transferred into a water bath and incubated at 58.5° C., and allowed to cool down to 58.5° C. for 10 min with occasional stirring. Promozyme® D2 (Novozyme) (2%, dsb, density 1.208 g/ml) was added to the paste and mixed well, and incubated at 58.5° C. for 3.5 hr. The debranching reaction was terminated by heating the samples in a boiling water bath for 5 min. The debranched sample was freeze-dried.

Gels of the debranched starches were made with 10% starch (w/w) in distilled water. The solution was heated in boiling water bath for 20 minutes until starch was gelatinized. Solution was removed from heat and allowed to cool below the gelling temperature. Thermal reversibility was shown by reheating the gel in hot water bath until the gel melted. The melting point of all gels was 80° C.

TABLE 1

| Starch | Gel melting temperature (° C.) | Punch force (g) - 1 day | Punch force (g) - 1 week |
| --- | --- | --- | --- |
| Waxy Corn | 80 | 30.938 | 40.152 |
| aewx (1 dose of ae) | 80 | 32.777 | 38.567 |
| aewx (2 doses of ae) | 80 | 42.736 | 49.453 |
| aewx (3 doses of ae) | 80 | Phase separation | Phase separation |

As shown thermal-reversible gels successfully were made using enzymatically debranched modified starch from aewx corn endosperm having either 1 or 2 doses of ae. Both gels strengthened over time. Gels made from aewx corn starch having 2 doses of ae exhibited the greatest strength after both 1 and 7 seven days' rest.

The same debranching procedure was run on waxy corn starch and aewx corn starch having two doses of ae, except that the debranching times were varied: the reaction was allowed to run for 2, 3.5 and 5 hours. Also the thermal-reversible gel was made with a starch-in-water concentration of 15% (w/w).

TABLE 2

| Starch | Debranching reaction time (h) | Gel melting temperature (° C.) | Gel punch force (g) 1 day | 1 week |
|---|---|---|---|---|
| Waxy corn | 2 | 80-85 | 78.3 | 141.6 |
|  | 3.5 | 80-85 | 93.0 | 138.5 |
|  | 5 | 80-85 | 82.7 | 126.7 |
| aewx (2 doses of ae) | 2 | 80-85 | 105.9 | 163.4 |
|  | 3.5 | 80-85 | 127.6 | 197.1 |
|  | 5 | 80-85 | 104.9 | 145.7 |

As seen the aewx corn starch with 2 doses of ae formed thermal-reversible gels that melted between 80° and 85° C. The gels exhibited greater strength than waxy corn regardless of reaction duration. Gels made from aewx corn starch with 2 doses of ae exhibited the greatest strength after being reacted for 3.5 hours.

EXAMPLE 3

Acid Hydrolysis

Starch (35% w/w starch in distilled water) was mixed with HCl (1.5% w/w) to prepare the slurry. The slurry was incubated in a water bath at 52° C. with agitation for 16 hours. The reaction was terminated by neutralization. The acid-thinned starch was retrieved by filtration and washing three times.

Gels made from the hydrolyzed starches were made using 15% (w/w in distilled water). Starch was fully gelatinized by heating the slurry in boiling water bath for 20 minutes. Starch solution was removed from heat and cooled until it gelled. All solutions that gelled did so at around 60° C. Thermal reversibility was shown by heating the gel in water bath. All gels were observed to melt at about 60° C.

TABLE 3

| Starch | Gel melting temperature (° C.) | Punch force (g) - 1 day | Punch force (g) - 1 week |
|---|---|---|---|
| aewx (1 dose of ae) | 60 | no gel | 22.765 |
| aewx (2 doses of ae) | 60 | 21.095 | 77.426 |
| Waxy Corn |  | no gel |  |

As seen acid hydrolyzed waxy corn did not form gels. Acid hydrolyzed starch from aewx corn endosperm having 1 and 2 doses of ae formed gels after one week's rest. Acid hydrolyzed starch from aewx corn endosperm having 2 doses of ae formed gels after one day's and one week.

The same acid hydrolysis reaction was run on waxy corn starch and aewx corn starch having 2 doses of ae except that the hydrolysis reaction was run for varying times, 8, 16 and 24 hours respectively. The gel was again made from solution with 15% starch-in-water (w/w).

TABLE 4

| Starch | Hydrolysis reaction time (h) | Gel Melting temperature (° C.) | Gel punch force (g) 1 day | 1 week |
|---|---|---|---|---|
| Waxy corn | 8 | 60-65 | no gel | 10.2 |
|  | 16 | 60-65 | no gel | 9.1 |
|  | 24 | 60-65 | no gel | 11.4 |
| aewx (2 doses of ae) | 8 | 60-65 | 33.5 | 105.7 |
|  | 16 | 60-65 | 26.1 | 84.4 |
|  | 24 | 60-65 | 26.7 | 61.2 |

Acid hydrolyzed starch from aewx corn endosperm having 2 doses of ae formed gels after one day, which strengthened after one week for all reaction durations. Gels were strongest after 8 hours of reaction. Waxy maize did not gel after one day's rest, and formed only very weak gels after one week's rest.

EXAMPLE 4

Physical Debranching

Physical debranching was done on starch in distilled water solutions with a starch concentration of 15% (w/w). The starch slurry was fully cooked in a boiling water bath for 20 minutes to completely gelatinize the starch. The resulting paste was sheared using a handheld blender for 1, 5, or 15 min, and then was poured into a foil loaf-pan and freeze-dried to recover the starch.

Gels were made from aewx corn starch having 2 doses of ae that were physically debranched as described above, and were compared to gels made from aewx corn starch having two doses of ae that was not debranched. Gels were made by mixing starch slurry (15% w/w in distilled water). The starch slurry was heated in boiling water bath to completely gelatinize the starch. The starch solution was then cooled until it gelled. Thermal reversibility was shown by reheating the gel in water bath until it melted. All gels melted at about 75° C.

TABLE 5

| Base | Modification | Shearing time (min) | Gel melting temperature (° C.) | Gel punch force (g) 1 day | 1 week |
|---|---|---|---|---|---|
| aewx (2 doses of ae) | None | None | 75 | 31.5 | 75.0 |
|  | Shear | 1 | 75 | 12.3 | 68.9 |
|  | Shear | 5 | 75 | 5.4 | 112.5 |
|  | Shear | 15 | 75 | 6.6 | 128.8 |

As seen all solutions formed gels. Gels formed from sheared starch significantly increased in strength after 1 week compared to gels allowed to rest one day. Additionally, gels sheared for 5 minutes or more exhibited at least twice the gel strength after being allowed to rest for one week as gels sheared for one minute and allowed to similarly rest.

EXAMPLE 5

Enzymatic Digestion

Starch slurry was prepared at 30% (w/w) concentration, and pH of the slurry was adjusted to 5.8. To the slurry, α-amylase (Spezyme® Fred L, DuPont) was added to the slurry at a concentration of 0.08% (w/w, dsb) and mixed well. The slurry was incubated in an oil bath equipped with an automated temperature controller. The enzymatic hydrolysis was conducted at 95° C. with stirring for 0.5 or 1 h, and the resulting hydrolysate was immediately poured into a foil loafpan and frozen in a freezer. The sample was recovered by freeze drying.

Gels were made from α-amylase waxy corn starch and aewx corn starch having 2 doses of ae were modified as described above. Gels were made at by mixing starch (30% w/w) and distilled water. The starch slurry was heated in boiling water bath to completely gelatinize the starch. The starch solution was then cooled until it gelled. Thermal reversibility was shown by reheating the gel in water bath until it melted. All gels melted at about 50° C.

TABLE 6

| Base | Digestion reaction time (h) | Solids in gel (%) | Gel punch force (g) | |
|---|---|---|---|---|
| | | | 1 day | 1 week |
| Waxy corn | 0.5 | 30% | No gel | No gel |
| | 1 | 30% | No gel | No gel |
| aewx (2 doses of ae) | 0.5 | 30% | No gel | 27.7 |
| | 1 | 30% | 4.5 | 54.6 |

As seen modified aewx corn starch having 2 doses of ae formed gels after one week regardless of the reaction time, but the gels were stronger after being allowed to rest for one week. Also, modified aewx corn starch having 2 doses of ae that was reacted for 1 hour formed gels after being allowed to rest for one day.

What is claimed is:

1. A thermal-reversible gel comprising:
   a fluid; and
   a modified starch from an aewx corn with an endosperm genotype having one or two doses of ae.

2. The thermal reversible gel of claim 1 wherein the starch is from an aewx corn with an endosperm genotype having two doses of ae.

3. The thermal reversible gel of claim 2 wherein when the modified starch is used to make a test gel, said test gel is characterized at least by the test gel having a punch strength of at least 100 g after 1 weeks' storage at 4° C.; wherein the test gel consists of no more than about 15% by weight of said modified starch in water.

4. A method for modifying a starch comprising:
   enzymatically modifying a starch from an aewx corn with an endosperm genotype having two doses of ae with an enzyme selected from the group consisting of pullulanase, isoamylase, and α-amalyse
   wherein when the modified starch is used to make a test gel, said test gel is characterized at least by the test gel having a punch strength of at least 100 g after 1 weeks' storage at 4° C.;
   wherein the test gel consists of no more than about 15% by weight of said modified starch in water.

5. The method of claim 4 wherein the starch is modified using with a pullulanase.

6. A method for modifying starch comprising:
   modifying a starch from an aewx corn with an endosperm genotype having two doses of ae by acid hydrolysis to make a modified starch so that said starch is capable of making a thermal-reversible gel.

7. The method of claim 6 wherein when the modified starch is used to make a test gel, said test gel is characterized at least by-the test gel having a punch strength of at least 100 g after 1 weeks' storage at 4° C.; wherein the test gel consists of no more than about 15% by weight of said modified starch in water.

8. A method for modifying starch comprising: shearing a starch from an aewx corn with an endosperm genotype having two doses of ae by acid hydrolysis to make a modified starch so that said starch is capable of making a thermal-reversible gel.

9. The method of claim 8 wherein when the modified starch is used to make a test gel, said test gel is characterized at least by the test gel has having a punch strength of at least 100 g after 1 weeks' storage at 4° C.; wherein the test gel consists of no more than about 15% by weight of said modified starch in water.

10. A food product comprising: (i) a modified starch from an aewx corn with an endosperm genotype having two doses of ae in an amount between 0.1% and 50% (w/w) of the food product, (ii) and another texturizinq constituent.

11. The food product of claim 10 wherein when the modified starch is used to make a test gel, said test gel is characterized at least by the test gel has having a punch strength of at least 100 g after 1 weeks' storage at 4° C.; wherein the test gel consists of no more than about 15% by weight of said modified starch in water.

12. The food product of claim 10 being selected from the group consisting of imitation cheeses, soups, desserts, sauces, gravies, pie fillings, yogurts, puddings, and dressings.

* * * * *